United States Patent [19]

Kistner

[11] Patent Number: 5,005,765

[45] Date of Patent: Apr. 9, 1991

[54] METHOD AND APPARATUS FOR APPLYING MULTICOMPONENT MATERIALS

[75] Inventor: Kenneth J. Kistner, Midlothian, Tex.

[73] Assignee: Specified Equipment Systems Company, Inc., Dallas, Tex.

[21] Appl. No.: 147,880

[22] Filed: Jan. 25, 1988

[51] Int. Cl.⁵ .............................................. B05B 7/04
[52] U.S. Cl. .................................. 239/135; 239/304; 222/135; 418/159
[58] Field of Search ................. 239/61, 303, 304, 135, 239/310, 337, 398; 415/207; 222/135; 417/201, 423 R, 556, 437; 418/159, 205, 191, 19, 29, 206

[56] References Cited

U.S. PATENT DOCUMENTS

| | | | |
|---|---|---|---|
| 2,824,524 | 2/1958 | Banker | 418/108 |
| 3,162,140 | 12/1964 | Petit | 418/206 |
| 3,409,222 | 11/1968 | Gelin . | |
| 3,516,764 | 6/1970 | Feroy | 418/19 |
| 3,682,054 | 8/1972 | MacPhail et al. | 239/304 |
| 4,154,368 | 5/1979 | Gusmer et al. | 222/135 |
| 4,376,512 | 3/1983 | Kistner | 239/106 |
| 4,519,748 | 5/1985 | Murphy et al. | 418/201 |
| 4,575,323 | 3/1986 | Yoshimura | 418/201 |
| 4,597,726 | 7/1986 | Soderlund et al. | 418/201 |
| 4,601,645 | 7/1986 | Schmitkons | 418/15 |
| 4,703,894 | 11/1987 | Fukuta et al. | 239/414 |
| 4,789,100 | 12/1988 | Senf | 239/432 |

FOREIGN PATENT DOCUMENTS 660978 4/1963 Canada .
3441604 7/1985 Fed. Rep. of Germany ........ 239/61

*Primary Examiner*—Andres Kashnikow
*Assistant Examiner*—Christopher G. Trainor

[57] ABSTRACT

A method and apparatus for metering and pumping multicomponents of high and low viscosity materials and subsequently mixing and applying the mixture includes gear pumps for pumping each component. Each gear pump has gears operating in a gear housing for receiving and pumping one of the components. The gear pumps are simultaneously driven at a predetermined speed and each gear pump is designed to pump a predetermined amount of its respective components, at the predetermined speed. Flexible hoses connect the pumps to an applicator. Check valves are used to maintain the pressure in these hoses when the pumps are in their at-rest position. The gear pumps may be driven at the same rotational speed but are designed to pump a predetermined amount of the different materials so that the ratio of materials can be precisely set.

34 Claims, 3 Drawing Sheets

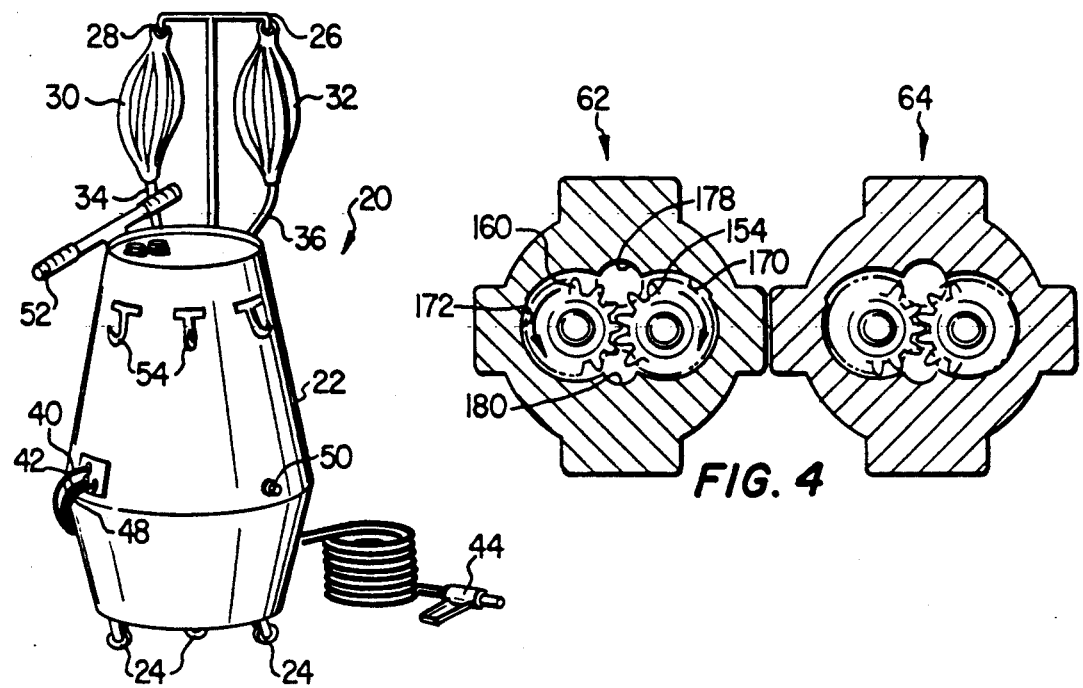
FIG. 1
FIG. 4
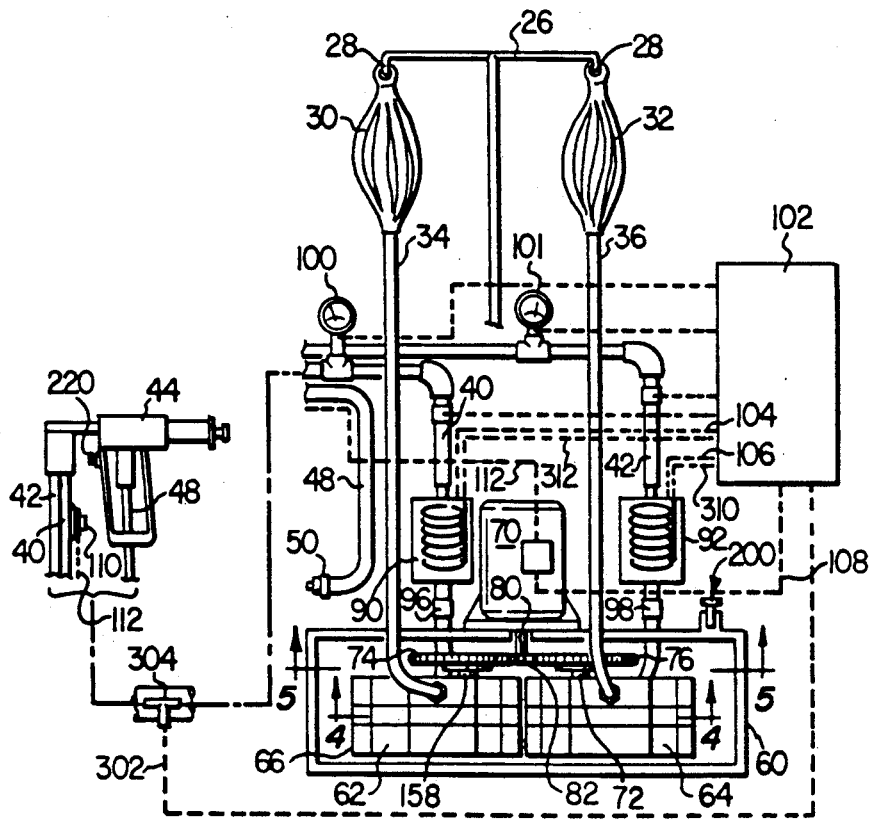
FIG. 2

METHOD AND APPARATUS FOR APPLYING MULTICOMPONENT MATERIALS

TECHNICAL FIELD

The present invention relates to a method and apparatus for applying multicomponent materials, and particularly to a system using gear pumps for pumping and metering the components for proper mixing and application.

BACKGROUND ART

Commercial and other buildings are regularly insulated and waterproofed by applying multicomponent coatings by spraying. As an example, roofs of commercial buildings are waterproofed by applying a polyurethane foam. The polyurethane foam is produced by pumping and spraying desired proportions of polymeric isocyanate and resin components.

In these systems, two or more components having different viscosities must be accurately metered throughout the spraying process. In spraying polyurethane foam, a one to one ratio is normally required. In other multicomponent organic resin sprays, such as for fire retardants and other insulations, a different ratio may be required. Further, these materials, because they must be mixed immediately prior to application to avoid premature set up, must be very accurately metered and sprayed at precise pressures and temperatures to achieve appropriate atomization of both components and their mixture. If the components are not properly proportioned, the coating may not properly set up and may not attain the intended properties.

Heretofore, substantial equipment has been required to accomplish the spraying of these multicomponent coatings and portable units have not existed. In most prior art systems, piston pumps are used for pumping each of the components. These systems are designed for large spray jobs, such as where an entire building roof is to be insulated. While the same systems are also used for small repair jobs, the bulk and size of the equipment makes this undertaking extremely costly.

In the prior systems which use piston pumps, it has been difficult to maintain a proper ratio of one component to the other at all pumping rates and conditions. Further, maintaining equal pressure of both components is difficult. Moreover, these problems are exasperated where small jobs are attempted.

For metering and applying dual component materials, only one system is known which uses gear pumps. This system, disclosed in a patent to the inventor of the present invention, U.S. Pat. No. 4,376,512, uses identical dual gear pumps driven by hydraulic motors connected in series. While this system operates satisfactorily for its intended purpose, it does not achieve the object of the present invention to provide a system which may be designed to easily and accurately proportion two or more different components being pumped.

DISCLOSURE OF THE INVENTION

With the limitations of the prior art devices in mind, one embodiment of the present invention provides a method and apparatus for metering and pumping multicomponents of a high viscosity coating material, such as an organic resin coating, and subsequently mixing and applying such mixture onto a surface or into a void. In this embodiment of the invention, the system includes the use of a gear pump for each component. Each gear pump has gears operating in a gear housing for receiving and pumping one of the components. The gear pumps are simultaneously driven at a predetermined speed and each gear pump is designed to pump a predetermined amount of its respective component, at the predetermined speed. In this way, a desired mixture ratio of the components is pumped. The materials are pumped to an applicator, which in one embodiment is a spray gun, for applying the components onto a surface.

In the system of the present invention, flexible hoses connect the pumps to the applicator or spray gun. Check valves are used to maintain the pressure in these hoses when the pumps are in their at-rest positions.

In a further embodiment of the invention, the gear pumps are driven simultaneously by an electric motor. Further, in one embodiment of the invention, the gear pumps may be driven at the same rotational speed but are designed to pump a predetermined amount of the different materials so that the ratio of the materials can be precisely set. For example, where a one to one ratio of isocyanate and resin is required, the gear pumps for pumping these two components may be rotated at the same speed, but because of the different viscosities of the materials, the lead clearances between the gears and the gear housing are different so that equal proportions of the two components are pumped.

Control of the pumps is in the hands of the operator whereby upon actuation of a control at the applicator, the electric motor is operated to instantaneously provide accurately metered amounts of the components. As in conventional units, air pressure may be delivered to the applicator to assist in its actuation.

In accordance with the present invention, the gear pumps are submerged in oil to prevent any contamination of the components, such as the isocyanate or resin, by air which might otherwise enter the system. The gear pumps are aligned such that the rotational axes are positioned vertically. In this way, any air entering the pumps with the component materials will be vented upwardly out of the pumps through bearing seals.

As in conventional systems, the components may be heated as they move from the gear pumps to the applicator.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a perspective view of the pumping and applying apparatus of the present invention;

FIG. 2 is a partially broken away vertical section view showing the interior of the apparatus of FIG. 1;

FIG. 4 is a section view taken along line 4—4 of FIG. 2;

DESCRIPTION OF THE PREFERRED EMBODIMENT

Figure 3:
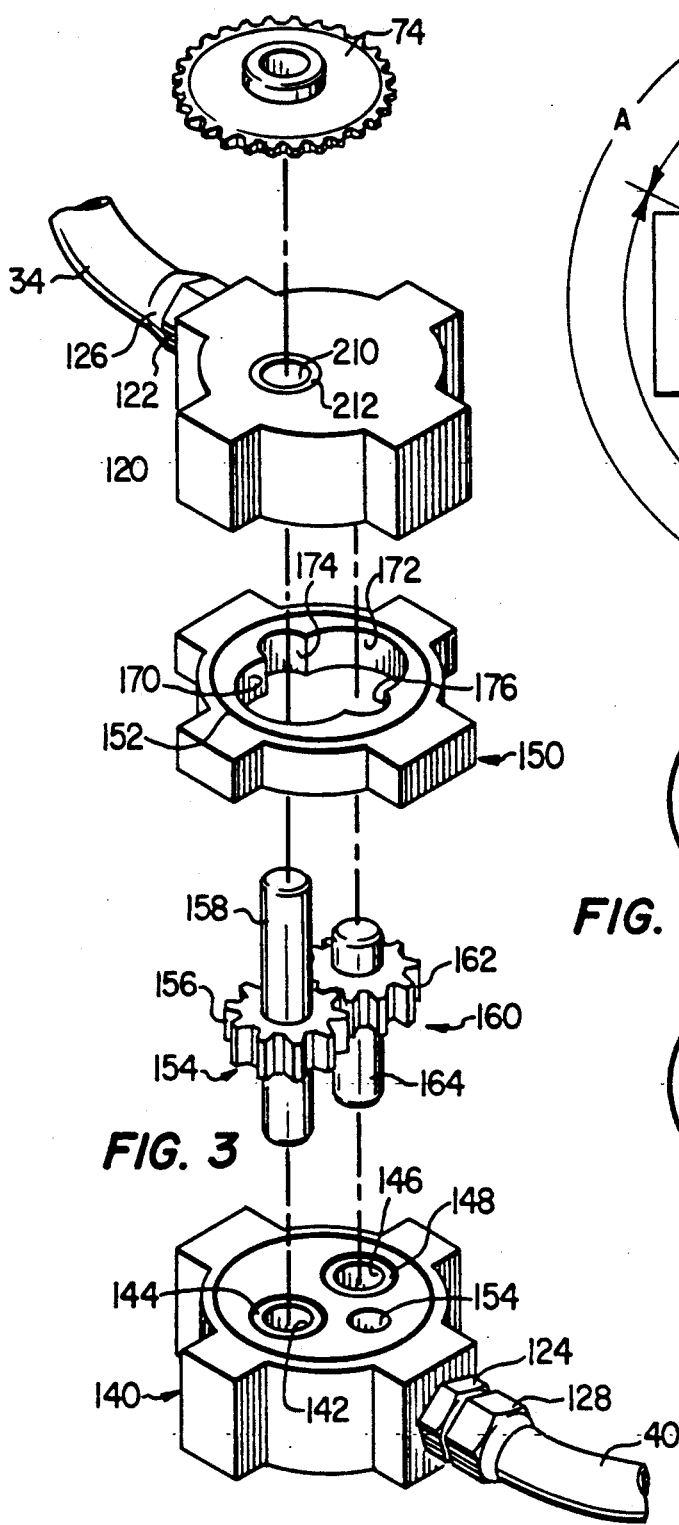
FIG. 3 is an exploded view of one of the gear pumps used in the present invention.

Referring now to the drawings and particularly FIG. 1, the present invention includes a multicomponent pumping apparatus 20 consisting of a main housing 22 supported on rollers 24. Housing 22 has a material support arm 26 having hook ends 28 for supporting collapsible component receptacles 30 and 32. These receptacles are connected to the interior structure within housing 22 by hoses 34 and 36, respectively. A pair of material flow hoses 40 and 42 exit housing 22 with spray gun 44 attached to their distal ends. An air line 48 also exits housing 22 and is connected to spray gun 44. An air supply inlet 50 is mounted on housing 22.

A handle assembly 52 is mounted to the top of housing 22, and hose storage J hooks 54 are mounted around the circumference of housing 22 for receiving hoses 40, 42 and 48 for storage.

Referring to FIG. 2 wherein the interior of housing 22 is shown, a fluid sealed pump housing 60 is mounted within housing 22 and has a pair of gear pumps 62 and 64 supported therein. Gear pumps 62 and 64 each have an outer housing 66 and 68, respectively, with a drive shaft 158 and 72, respectively, extending therefrom. Sprockets 74 and 76 are mounted on shafts 158 and 72, respectively.

Figure 6:
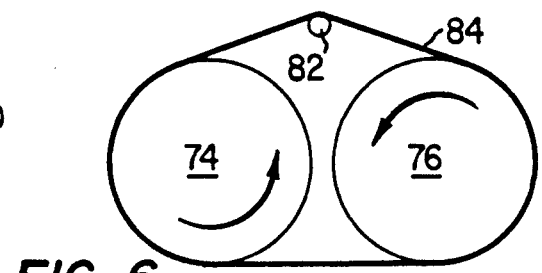
FIG. 6 is a section view taken along line 6—6 of FIG. 2 showing the sprocket gearing between the gear pumps and drive motor.

Referring to gear pump 62, hose 34 is connected to the inlet of pump 62 and hose 40 is connected to the outlet. Referring to gear pump 64, hose 36 is connected to the inlet thereof and hose 42 is connected to the outlet. Referring still to FIG. 2, an A-C, 120 volt, 15 amp electric motor 70 is mounted to the top of gear pump housing 60 and has a drive shaft 80 extending into the housing. As can be seen in FIGS. 2 and 6, drive shaft 80 has an appropriate sprocket 82 which is aligned with sprockets 74 and 76 of gear pumps 62 and 64. A drive chain 84 is entrained around sprockets 74, 76 and 82 such that the operation of electric motor 70 drives gear pumps 62 and 64.

Referring still to FIG. 2, component receptacles 30 and 32 supply material through lines 34 and 36, respectively, to gear pumps 62 and 64, respectively. Where polyurethane foam coatings are sprayed using the present device, one of the receptacles is filled with polymeric isocyanate while the other is filled with an appropriate catalytic resin. An appropriate heater 90 is installed adjacent hose 40 which is connected at its distal end to spray gun 44. Similarly, an appropriate heater 92 is installed adjacent hose 42 which is connected at its distal end to spray gun 44. As is seen in FIG. 2, air inlet coupling 50 is connected to air line 48 which is also connected at its end to spray gun 44.

Hoses 40 and 42 have pressure gauges 100 and 101, respectively, mounted in the line downstream of heaters 90 and 92. Both hoses 40 and 42 have a check valve 96 and 98, respectively, mounted close to the point of connection of these hoses to the gear pumps. These check valves, which are on the pressure side of pumps 62 and 64, permit fluid to be pumped from the gear pumps, but upon cessation of pumping, maintains fluid in hoses 40 and 42 under pressure.

A controller 102 is connected by way of electric lead 104 and 106 to heaters 90 and 92, respectively, and by electric lead 108 to motor 70. Controller 102 prevents the operation of motor 70, and thus the operation of the system, until the fluid within the lines has reached a predetermined temperature. Controller 102 may be one of several units available on the market and in one embodiment of the invention is a digital display, automatic control and monitoring system, MF-1 Series, manufactured by Rika-Kogyo Co., Ltd., Tokyo, Japan.

Motor 70 is controlled by the operator's use of a switch 110 mounted on the hose adjacent to spray gun 44 and connected to motor 70 by electric lead 112.

Figure 5:
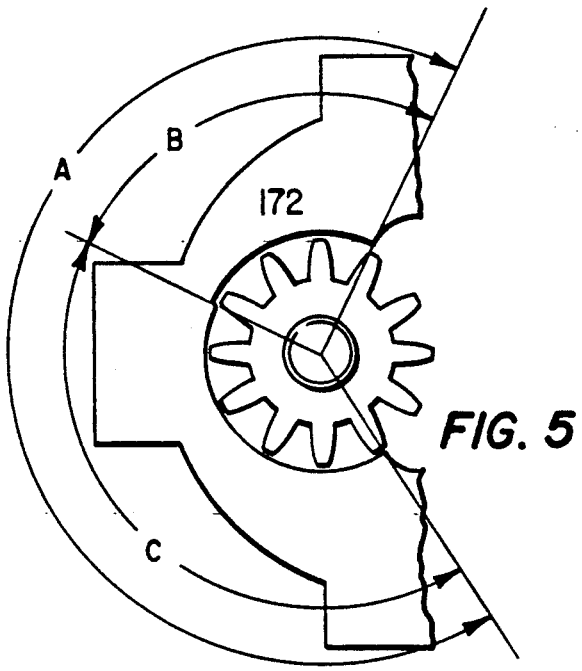
FIG. 5 is an enlargement of a portion of the section view of FIG. 4 showing the clearance between the pump gears and the surround housing in more detail.

FIG. 3 shows gear pump 62 in an exploded view. It will be appreciated that gear pump 64 has components similar to those in gear pump 62 although the clearances between the gears and gear housing may be different to accomplish the result described below. FIG. 4 is a section view taken along line 4—4 of FIG. 2, showing a plan section through both gear pumps 62 and 64. FIGURE 5 is an enlarged view of the gear and surrounding housing of gear pump 62.

Referring to FIG. 3 in conjunction with FIGS. 4 and 5, gear pump 62 includes a housing 66 with an upper section 120 having an appropriately threaded fitting 122 for receiving threaded end 126 of inlet hose 34. Hose 34 communicates into inlet or suction port 178 (FIGURE 4). Housing 66 of gear pump 62 also includes a lower section 140 having an appropriately threaded fitting 124 for receiving threaded end 128 of discharge or outlet hose 40. Hose 40 communicates with discharge port 180 (FIG. 3). Lower section 140 includes bores 142 and 146 with roller bearings 144 and 148 mounted therein. Upper section 120 also includes a bore 210 therethrough with roller bearings 212 with an appropriate seal therein. Although not shown in FIG. 3, the underside of upper section 120 also includes a bore with roller bearings therein aligned with bore 146 in lower section 140.

A gear housing section 150 is assembled between upper and lower sections 120 and 140. Appropriate seals are used therebetween, such as O-rings 152 and 154, to form a fluid tight seal between the sections when assembled. A drive gear assembly 154 includes a gear section 156 mounted for rotation with a shaft 158. Shaft 158 has its lower end journaled in bore 142 within lower section 140 and its upper end positioned through bore 210 in upper section 120. Sprocket 74 is mounted to the upper end of shaft 158 external of housing 66. A driven gear 160 includes a gear section 162 mounted for rotation with a shaft 164. The upper end of shaft 164 is mounted in the bore in upper section 120 and bore 146 in lower section 140. Gear section 162 meshes with gear section 156 and is driven by the rotation of gear section 156.

Gear housing section 150 has machined surfaces 17 and 172 which are aligned with gear sections 156 and 162 upon assembly. Gear housing section 150 also has a machined surface 174 which corresponds to the inlet or suction port 178, and a machined surface 176 which corresponds with the outlet or pressure port 180. As can be seen in FIG. 4, drive gear assembly 154 rotates in a clockwise direction and driven gear 160 rotates in a counterclockwise direction drawing fluid from the suction port around the gear section to the pressure port 180. The clearance between teeth 156a of gear section 156 and of teeth 162a of gear section 162 and machined surfaces 170 and 172, respectively, adjacent inlet port 178, is slightly greater than that clearance between the teeth and the machined surface near the outlet port. In one embodiment of the invention, the clearance adjacent the inlet port is 0.005 in. (0.0127 cm) while the clearance adjacent the outlet port is 0.003 in. (0.0076 cm). In the present invention, because materials of various viscosities, and in fact materials having substantially different viscosities, are pumped and metered accurately, this clearance between the gear teeth and the corresponding machine surfaces in gear pump 62 may differ from that in gear pump 64. Specifically, precise metering of materials of different viscosities is achieved in the present invention by control of these clearances.

In one embodiment, shown in detail in FIG. 5, the clearance between the gear teeth and the corresponding machined surfaces vary along the confronting surface, indicated by the arc A. The clearance along a sector of arc A, specifically along the arc designated by the letter B, will be greater than the clearance along the remaining sector, designated by the letter C. For example, the clearance between the gear teeth of gear 162 and the corresponding surface 172 along arc B may be 0.005 in. 0.0127 cm) whereas the clearance between the gear teeth and the surface 172 along arc C may be 0.003 in. (0.0076 cm). While the embodiment shown in FIG. 5 illustrates a step from the arc sector B to arc sector C, it will be appreciated that this surface may be a gradual variation without a step at the point of transition. However, it will be appreciated that these clearances will generally be the same for gears 154 and 160 of pump 62 but that the clearances will differ in comparison to those in pump 64 to compensate for the differences in viscosities of the materials being pumped as well as to precisely control the amount of material being pumped from each pump to achieve a desired pumping ratio between the two pumps. This difference is achieved because the pressure produced by the gear pumps is directly proportional to the speed of rotation of the gears, the amount of clearance between the gears and the adjacent surface as well as the overall geometry of the clearance. For example, pump 62 will have a lower pressure where the arc B is longer than in a comparable arrangement where arc B is smaller provided the clearance along arc B is greater than the clearance along arc C.

Thus, where the clearance between the gear teeth and the corresponding machined surface is greater for a longer arc B from the suction port to the pressure port, then a desired pressure reduction for the particular material pumped is induced. Similarly, where this clearance and the arc length of such clearance is reduced, then the pressure rise is increased depending upon the viscosity of the material. Of course, with different viscosities of material, by adjusting the fixed lead arc length and the clearance between the teeth and the corresponding machined surface, gear pumps 62 and 64 may be made to pump the same pressure and volume of material even though the materials have different viscosities and even though the rotation of the pumps are identical.

Thus, in one embodiment of the invention, the clearance between the gear teeth in pump 62 and the corresponding machined surface may be within the range of 0.001 to 0.003 in. (0.0025 cm to 0.0076 cm), while the clearance between the gear teeth of the gears and corresponding machine surfaces for gear pump 64 may be within the range of 0.001 to 0.005 in. (0.0025 cm to 0.0127 cm). This variation may be used to compensate for the differences in viscosities between the isocyanate material and the resin material, or between other multicomponent materials being pumped. In this embodiment, gear pumps 62 and 64 are driven at the same speed, and therefore driven by a single motor without a reduction or step up in gearing between the motor and the gear pumps. Thus, the torque which can be imparted to each gear pump can be readily determined for proper design and operation.

In one embodiment of invention, appropriate gearing is provided such that a standard 1750 rpm electric motor is used, driving gear assemblies 154 and 160 at approximately 140 rpm. A two speed motor can be used wherein the motor speed can be reduced to 1150 rpm, resulting in a rotation speed of the gear assemblies to approximately 90 rpm.

Figure 7:
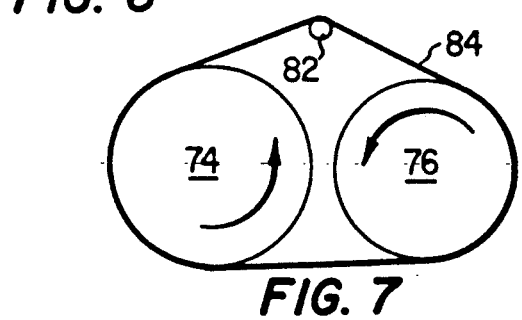
FIG. 7 is a section view taken along line 6—6 of FIG. 2 but showing an alternative gearing.

Although in the preferred embodiment shown, the gear pumps 62 and 64 are driven at the same speed, it will be appreciated by those skilled in the art that various gear reductions and the like may be used to vary the rotational speed of the gear pumps to provide different ratios of flow of the various materials. Such an arrangement is shown in FIG. 7 wherein variation in the sprockets 74 and 76 may be incorporated to produce a different rotation speed in pump 62 from that in pump 64. This change in rotation speed may of course be made by other transmission devices not shown, but with the same end result of producing a system with different speeds of rotation to either compensate for different viscosities of material or to pump different ratios of material as desired. Likewise, it will be appreciated by those skilled in the art that more than two gear pumps may be used where multiple component materials are being pumped. In this arrangement, either one or more motors may be used to drive the multiple gear pumps to pump the various components prior to mixing and application of such components.

Figure 9:
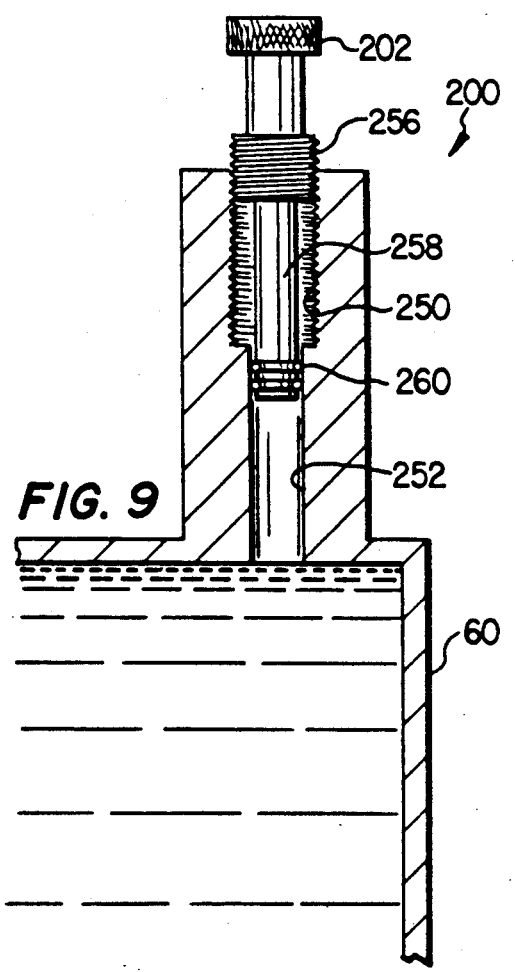
FIG. 9 is an enlarged section view of the pump housing plug used in the present invention.

Referring now to FIGS. 2 and 9, pump housing 60 has threaded inlet 200 for receiving a plug 202. Inlet 200 has a threaded bore 250 with a reduced bore 252 therebelow. Plug 202 has external threads 256 which mate with threads 250 and an extended shaft 258 having an O-ring 260 fitted in an annular groove near its end. O-ring 260 has a external diameter which sealingly engages the interior wall of bore 252. As can be seen in FIG. 9, insertion of plug 202 into inlet 200 causes a sealing engagement between O-ring 260 and the interior bore 252 of the inlet.

The housing is completely filled with lightweight oil such that pumps 62 and 64 are submerged in oil at all times. The oil within gear pump housing 60 is slightly under pressure by virtue of filling the housing completely and then reducing the volume of the housing by inserting threaded plug 202 into inlet 200. During operation of pumps 62 and 64, the pumps also act under an internal pressure which is generated by operation of the pump. Therefore, a pressure balance is achieved between the interior pressure of the pump and the external pressure of the oil included in pump housing 60. This pressure balance prevents the seepage of components out of the gear pump as well as the seepage of oil into the gear pump. However, by submerging pumps 62 and 64 within oil, the likelihood of introduction of air into the pumps, and thus air contamination of the materials being pumped by air, is avoided. Air which is brought into the system with the components being pumped migrates out of the system, and in fact is pressurized out of the system, by the internal pressure of the pump along the upward section of shaft 158 of gear section 156, moving out of the pump housing at seal 212 around shaft 158. Thus, air is effectively kept out of the system and is effectively removed from the system during operation.

Figure 8:
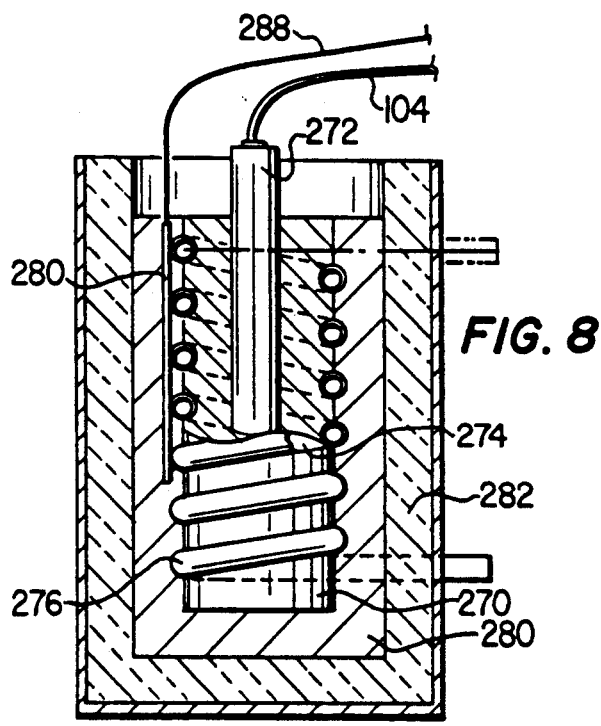
FIG. 8 is an enlarged section view of the heater of the present invention.

FIG. 8 shows heater 90 in detail, heater 92 being identical thereto. Heater 90 includes an aluminum core 270 having a bore therein for receiving a heat rod 272 centrally therein. Core 270 has an externally spiraled groove 274 formed therearound which receives a stainless steel pipe 276 therein. Pipe 276 is connected on its lower end by an appropriate fitting to discharge hose 40 from pump 62 and at its exit end to the continuation of hose 40. A temperature sensor 280 is positioned adjacent pipe 276 and is connected by an appropriate electrical lead 288 to controller 102. An aluminum epoxy shell is formed around core 270 and pipe 276 with a foam insulation 282 formed thereover. Heat rod 272 is connected by an appropriate lead 104 as referred to hereinabove.

Figure 10:
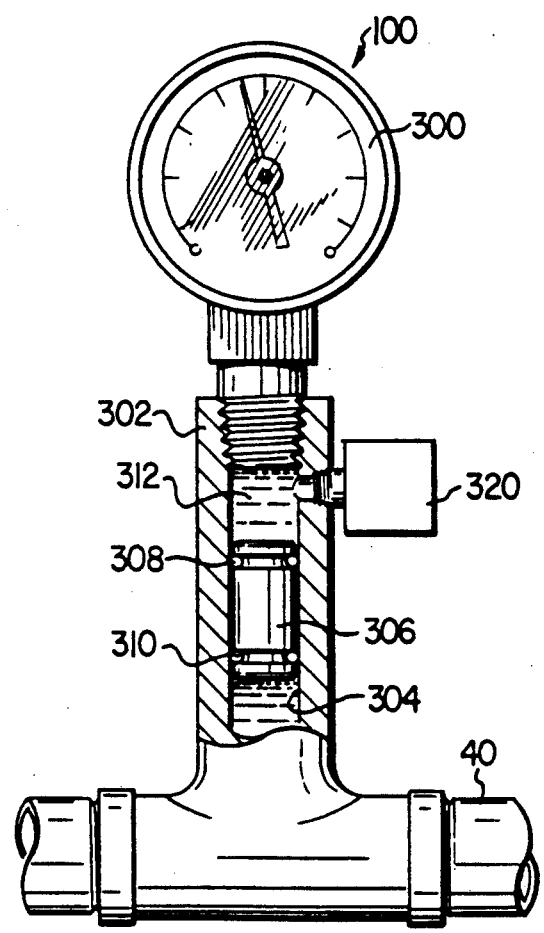
FIG. 10 is an enlarged section view of the pressure gauge structure used in the present invention.

FIG. 10 illustrates pressure sensor 100 in detail, sensor 101 being identical thereto. Referring to FIG. 10, sensor 100 includes an appropriate gauge 300 which has a threaded connection for engagement within a connector sleeve 302 having an appropriate cylinder 304 formed therein. Sleeve 302 is connected by an appropriate connection to chemical hose 40 as shown. A movable piston 306 is received within cylinder 304 of sleeve 302 and has an upper oil seal 308 and a lower chemical seal 310 thereon. Both seals form a fluid seal between piston 306 and cylinder 304. Hydraulic oil is loaded within the chamber 312 defined above piston 306 and thus communicates with pressure gauge 300. Thus, chemical below piston 306, which applies a pressure within hose 40, applies a pressure on piston 306. This pressure is communicated by piston 306 on hydraulic oil in chamber 312 to gauge 300 wherein the pressure in base 40 is then read.

In this way, chemical is not directly communicated to gauge 300. Because of the chemicals normally used in these systems, exposure of pressure gauge 300 to such material would result in short term if not immediate failure or malfunction. The present system isolates the gauge from the chemical while permitting the reading of the pressure for use in controlling the present system. A safety switch 320 is mounted on sensor 100 and reads pressure in chamber 312. Switch 320 is connected by an appropriate lead to controller 102. This safety switch functions to shutdown the system, that is terminate operation of motor 70, upon sensing a predetermined pressure.

Although the above system, the operation of which is described below, is designed for the pumping of dual component materials and the subsequent spraying of such materials, it will be appreciated that the present invention is not limited to applications of material by spraying. Other types of applicators may be used depending upon the particular material being applied. For example, the present system may be used for mixing multicomponent materials which are used to form packaging insulation. Thus, an applicator necessary to combine the materials and discharge them into a void or other desired area may be used. Further, the present system may be used to apply a multicomponent material onto a surface to form a sheet material. In this case, an applicator other than a spray device may be used.

Referring to the embodiment illustrated in the drawings, operation of the apparatus of the present invention is as follows. For pumping a polyurethane foam, polymeric isocyanate is loaded into collapsible receptacle 30 and an appropriate resin is loaded into receptacle 32. These materials are delivered to the suction ports of pumps 62 and 64, respectively, by way of hoses 34 and 36. Activation of electric motor 70 by the operator, using switch 110, rotates sprocket 82 which in turn rotates sprockets 74 and 76 of the gear pumps, driving the gear sections of the corresponding pumps. This rotation draws the component materials into the suction side of the pump and discharges the materials through the pressure ports in the pumps. The fluids then pass through check valves 96 and 98 and adjacent heater elements 90 and 92, respectively, and then to spray gun 44.

When sufficient pressure has been developed in the hoses, the operator engages switch 220 which opens gun 44 and allows the spraying of material therefrom. Gun 44 is actuated by way of air supplied thereto through hose 48. The present system includes pressure gauges 100 and 101 on hoses 40 and 42, respectively, and these gauges are connected by appropriate leads to controller 102 to prevent excessive build up of pressure in the hoses. When maximum pressures are reached, the controller automatically shuts off motor 70.

The present system is unique in that it permits independent operation of motor 70 and actuation of gun 44. Thus, where a smaller amount of material is to be sprayed or applied, the operator can actuate valve 220 prior to developing maximum pressure in hoses 40 and 42. Likewise, the operator may bleed down pressure by actuating switch 220 without driving motor 70. Thus, a precise amount of foam may be developed by virtue of these independent controls. Of course, the system may be set up such that maximum pressure is maintained by the automatic actuation of motor 70 with the spraying of material being accomplished by use of a single switch, such as 220, for discharge of material.

The rotation of pumps 62 and 64 is instantaneous, and therefore the pressure to gun 44 builds immediately to a pumping pressure of approximately 1100 psi. Upon deactivation of switch 110, the rotation of pumps 62 and 64 is stopped. However, check valves 96 and 98 maintain pressure within the lines 40 and 42 to gun 44. Thus, when the operator is again ready to continue spraying, working pressure exists in the pressure lines and by merely actuating switch 110, simultaneously with spray gun control switch 220, a perfect spray is achieved. Likewise, accurate metering of material through pumps 62 and 64 is achieved by virtue of the proper setting and design of the pumps for the particular material being sprayed. Thus, it has been found that the present system, even when built as a portable system, may easily pump 0 to 8 pounds of foam per minute, maintaining precise metering accuracy of the two components necessary in the spraying process.

Although the system may be built as a portable system, it will likewise be recognized that these components may be easily made to pump extremely large quantities of material. Indeed, the system may be designed to pump 1,000 pounds per minute or more as is dictated by the specifications of a particular job.

Likewise, more than two components may be sprayed by simply adding an additional gear pump and the necessary drive mechanism from motor 70 to rotate the pump as required. In addition to varying the lead clearance between the gears and the gear housing, different gear speeds may be achieved by an appropriate gear transmission which can be interconnected between motor 70 and the gear pumps.

Thus, the present invention provides a method and apparatus for precisely metering and pumping multi-components of high and low viscosity materials, such as an organic resin coating, and subsequently mixing and applying such mixture. The material may be applied by spraying or may be deposited into a container or other void as necessary for the particular application desired. The system includes the use of a gear pump for each component. Each gear pump has gears rotating in a gear housing for receiving and pumping one of the components. The gear pumps are simultaneously driven at a predetermined speed and each gear pump is designed to pump a predetermined amount of its respective component, at the predetermined speed. By controlling the clearances between the gears in the gear pump and their respective housing, the gear pumps are designed to pump precise amounts of the material discharged from the pump to maintain an appropriate ratio of materials as needed. This is accomplished, even though the various materials pumped may have different viscosities, by using different leads and clearances between the gears and the gear housings so that desired proportions of the components are pumped.

Because the present design uses an electric motor of low voltage and low amperage, the system is readily adaptable for portable use. Further, spraying pressures may be instantaneously produced because of the design and use of positive displacement gear pumps rather than piston pumps, in conjunction with check valves for maintained pressure to the spray gun between use. Of course, prime movers other than an electric motor may be used to drive the gear pumps. For example, a hydraulic motor may be substituted for the electric motor.

Although a preferred embodiment of the invention has been described in the foregoing detailed description and illustrated in the accompany drawings, it will be understood that the invention is not limited to the embodiment disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A system for metering dual component materials comprising:
    a first gear pump and a second gear pump, one for receiving and pumping each of the components,
    a drive source for simultaneously driving said gear pumps, said gear pumps having mesh gears rotating in a gear housing and said first gear pump having a first clearance between a radially outer tip of said gears and said gear housing and said second gear pump having a second clearance between a radially outer tip of said gears and said gear housing, said first and second clearances selected such that said gear pumps pump a predetermined amount of each component to produce a desired ratio of the components being pumped when said pumps are driven, and
    an applicator for receiving said components from said gear pumps and for applying said components onto a surface or into a void.

2. The system according to claim 1 wherein said pumps are rotated at the same rotational speed.

3. The system according to claim 1 wherein said pumps are rotated at different rotational speeds and pump substantially equal amounts of each component.

4. The system according to claim 1 wherein said pumps are rotated at the same rotational speed using a single motor.

5. The system according to claim 1 wherein said pumps are rotated at the same rotational speed and pump substantially equal amounts of each component.

6. The system according to claim 1 wherein said clearance between the gears and gear housings for the first and second pumps are designed to compensate for a difference in the component viscosities such that the desired ratio of the components is pumped.

7. The system according to claim 1 wherein said gear pumps are submerged in pressurized fluid.

8. The system according to claim 1 wherein said components are components for spraying polyurethane foam.

9. The system according to claim 1 further comprising:
    means for heating said components as they are pumped from the gear pumps.

10. The system according to claim 1 further comprising:
    operator controlled shut off means for stopping said drive source,
    lines for connecting said pumps to said applicator, and
    check valves in said lines for maintaining pressure in said lines between said pump and applicator when said drive source is shut off.

11. A system according to claim 10 further comprising:
    second operator control means for operation independent of the operator control shut off means for discharging said material through said applicator means.

12. A system for pumping and applying multicomponent materials having different properties comprising:
    a pump assembly comprising a gear pump for each component, said gear pump having intermeshing gears operating in a gear housing for receiving and pumping one of the components,
    a drive source for simultaneously driving said gear pumps at a predetermined speed, each said gear pump having a design efficiency defined by a clearance between a radially outer tip of said gears and said gear housing and tailored to the particular material being pumped to pump a predetermined amount of the component, at the predetermined speed, to produce a desired ratio of mixture of the components,
    an applicator for receiving said components from said pump means and for applying said components, and operator controlled shut off means for stopping said drive source,
    flexible lines for connecting said pump assembly to said applicator means, and
    check valves in said lines for maintaining pressure in said lines between said pump assembly and applicator when said drive source is shut off.

13. The system according to claim 12 wherein said pumps are rotated at the same rotational speed.

14. The system according to claim 12 wherein said pumps are rotated at different rotational speeds and pump substantially equal amounts of each component.

15. The system according to claim 12 wherein said pumps are rotated at the same rotational speed using a single motor.

16. The system according to claim 12 wherein said pumps are rotated at the same rotational speed and pump substantially equal amounts of each component.

17. The system according to claim 12 wherein the clearances between said gears and gear housing are selected to produce the desired ratio for the two components being pumped.

18. The system according to claim 17 wherein said clearance between the gears and gear housings for the first and second pumps are designed to compensate for the difference in component viscosities such that the desired ratio of components is pumped.

19. The system according to claim 12 wherein said gear pumps are submerged in pressurized oil.

20. The system according to claim 12 wherein said components are components for spraying polyurethane foam.

21. The system according to claim 12 further comprising:
means for heating said components as they are pumped from the gear pumps.

22. A system for pumping and spraying multicomponent materials having different viscosities comprising:
pump means comprising a pump unit for each component, each pump unit comprising rotatable gears operating in a gear housing, each said pump unit having a component inlet and a component outlet,
means for simultaneously driving the gears of each pump unit at selected predetermined speeds, each said gear pump unit having a pumping efficiency defined by a clearance between a radially outer tip of said gears and said gear housing and tailored to the component being pumped to pump a predetermined amount of the component, when driven at its predetermined speed, so that a predetermined ratio of the components is pumped, and
spray means for receiving the components from said pump means and for applying said components.

23. The system according to claim 22 wherein said pumps are rotated at the same rotational speed.

24. The system according to claim 22 wherein said pumps are rotated at different rotational speeds.

25. The system according to claim 22 wherein the clearances between the gears of one pump and its housing and the gears of another pump and its housing differ to pump the predetermined ratio of the components.

26. The system according to claim 22 wherein the clearances between said gears and gear housing are selected to produce the predetermined ratio for the two components being pumped.

27. The system according to claim 26 wherein said clearance between the gears and gear housings for the first and second pumps are designed to compensate for the difference in component viscosities such that the predetermined ratio of the components is pumped.

28. The system according to claim 22 wherein said gear pumps are submerged in pressurized oil.

29. The system according to claim 22 wherein said components are components for spraying polyurethane foam.

30. The system according to claim 22 further comprising:
means for heating said components as they are pumped from the gear pumps.

31. The system according to claim 22 further comprising:
operator-controlled shut off means for stopping said drive means,
lines for connecting said pumps to said spray means, and
means for maintaining pressure in said lines between said pump means and spray means when said driving means is shut off.

32. A system according to claim 22 further comprising:
second operator-controlled means for operation independent of the operator controlled shut off means for discharging said materials through said applicator means.

33. A system for pumping and applying multicomponent materials of different viscosities comprising:
a pump assembly comprising a pump for each component,
a drive source for simultaneously driving said pumps at a predetermined speed, each said pump having a pump efficiency defined by a clearance between a radially outer tip of said gears and said gear housing and tailored to the component viscosity to pump a predetermined amount of the component, at the predetermined speed, to produce a desired ratio of mixture of the components,
an applicator for receiving said components from said pumps and for applying said components,
an operator controlled shut off means for stopping said drive source,
lines for connecting said pumps to said applicator, and
check valves in said lines for maintaining pressure in said lines between said pumps and applicator when said drive source is shut off.

34. A system according to claim 33 further comprising:
a second operator controlled means for operation independent of the operator controlled shut off means for permitting selective discharge of said materials through said applicator.

* * * * *

UNITED STATES PATENT AND TRADEMARK OFFICE
CERTIFICATE OF CORRECTION

PATENT NO.  : 5,005,765
DATED       : April 9, 1991
INVENTOR(S) : Kenneth J. Kistner It is certified that error appears in the above-identified patent and that said Letters Patent is hereby corrected as shown below:

Column 4, line 41, change "154" to --153--.

Column 7, line 35, change "base" to --hose--.

Signed and Sealed this

Thirtieth Day of March, 1993

*Attest:*

STEPHEN G. KUNIN

*Attesting Officer*  Acting Commissioner of Patents and Trademarks